March 1, 1966 — R. J. BLACK ETAL — 3,237,590
STRAIN GAUGE MEANS
Filed Sept. 13, 1963
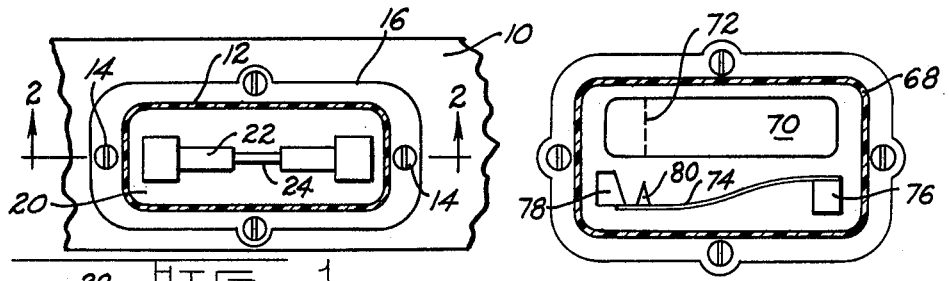
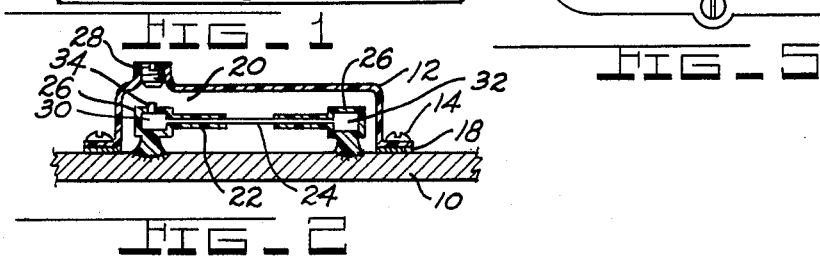
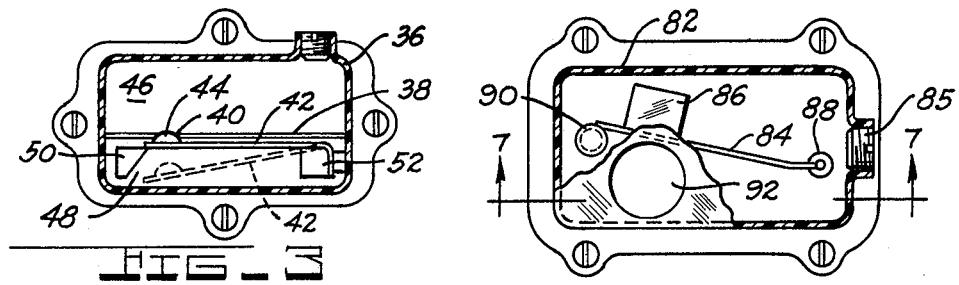
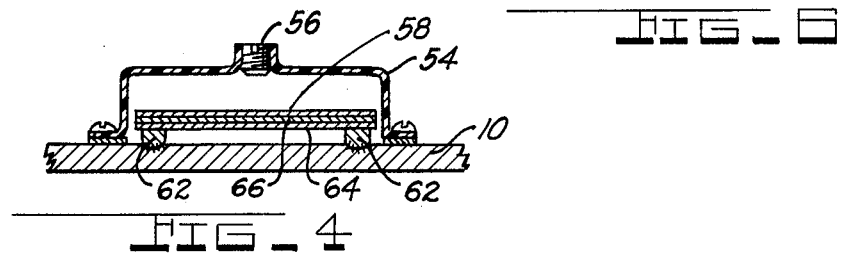
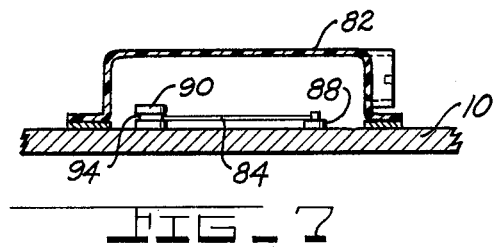
RAYMOND J. BLACK.
ALBERT H. OSBORNE.
INVENTORS.
BY Richard F. Guib
ATTORNEY.

United States Patent Office 3,237,590
Patented Mar. 1, 1966

3,237,590
STRAIN GAUGE MEANS
Raymond J. Black and Albert H. Osborne, South Bend,
Ind., assignors to The Bendix Corporation, South Bend,
Ind., a corporation of Delaware
Filed Sept. 13, 1963, Ser. No. 308,758
6 Claims. (Cl. 116—114)

This invention relates to means for giving a visual indiction when an overloading strain is applied to a member.

With regard to vehicle shock absorbing means, it has long been desired to provide a visual indication of when said means has been loaded excessively. In more detail and with special regard to aircraft, hard landings (landings which when made with conventional undercarriage result in extreme decelerating forces being transmitted to the vehicle) to cause deformation of a shock absorber and/or the associated vehicle. In fact, this condition may well be the result of system energy exceeding the capacity of the existing shock absorbing units, thereby culminating in a bottoming condition for the shock absorbers. Needle-pin contour normally controls the maximum load that may develop. It is the purpose of our invention to indicate the existance of the overload by a simple, practical, fail-safe visual indicator.

In more detail, it is the principl object of our invention to indicate if a predetermined material strain value has been exceeded in a piece of hardware.

Another object of our invention is to attach a simple strain indicator permanently to a member so as to be continually sensitive throughout a given length of in-service operation of the member.

Still another object of our invention is to provide an indicator that is self-contained, requiring no hydraulic, electrical or automatic power supply.

It is also an object of our invention to provide means whereby excessive strain is indicated by a pronounced and easily detectable, chemically-induced color change over an area that is readily observable.

A further object is to provide a mechanically triggered visual indicating means for strain measurement.

It is still a further object of our invention to provide means whereby several gauges can be applied to one piece of hardware to get indications for different loading conditions, or different critical areas.

Other objects and advantages will become more apparent to those skilled in the art to which our invention relates from the following disclosure and drawings in which:

FIGURE 1 is a cross-sectional view of a container having a strain gauge member contained therein in accordance with the principals of our invention;

FIGURE 2 is a side view of the strain gauge embodying features of our invention as shown in FIGURE 1 along lines 2—2 thereof;

FIGURE 3 is a cross-section side view of a container constructed in accordance with our invention that may be applied to the side of a member to be checked;

FIGURE 4 is a cross-section side view of another embodiment of a colorific strain gauge indicator in accordance with our invention;

FIGURE 5 is still another cross-sectional view of a strain gauge in accordance with the principals of our invention;

FIGURE 6 is a partially broken cross-section view of still another form in which my invention may be cast; and FIGURE 7 is a cross-sectional side view of the structure of FIGURE 6 taken along line 7—7.

More particularly, FIGURE 1 shows a plan view of a member or piece of hardware 10 to which a transparent container 12 is mounted as by bolts 14 spaced about the peripheral flange 16 of the container. As seen in FIGURE 2, a seal or gasket 18 is provided underlying the peripheral flange 16 so as to seal the interior of the container 12. Thus, we have provided an interior 20 in which we mount a rupturable member 22.

As seen in FIGURE 2 the rupturable member 22 includes a central capillary tube having a centrally exposed portion with the two end portions thereof bonded to end fittings 26 that are in turn bonded or otherwise affixed to the hardware or member 10, such as the wall of a shock strut or the like. The end fittings 26 are spaced a predetermined distance so that the walls of the exposed portion of the capillary tube 24 will rupture upon slight deflection of one end fitting as respects the other.

Within the chamber 20 we prefer to employ a solution such as dimethylglyoxime that is inserted in chamber 20 through the fill opening 28; whereas, within the capillary tube 24 and a pair of chambers 30 and 32 of the respective end fitting therefor we provide a slightly ammonical solution of ammonia hydroxide, nickle nitrate, and water which is inserted therein through a fill opening 34 similar to that provided within the transparent container 12 and, in fact, underlying the fill opening 28 thereof.

As for the other modifications we have shown in the drawings, we direct attention first to FIGURE 3 showing a similar transparent container 36, which in the form shown is adapted to be mounted to the side of a member such as the shock strut aforementioned. The mounting and sealing would in all cases be similar to that described for FIGURES 1 and 2, for not only this modification but for the following descriptions of the other modifications that we have envisioned. In any event, as seen in FIGURE 3 the container 36 is compartmented by a membrane 38 which is provided with an opening 40. Underlying the membrane 38 we have mounted a spring lever 42 that in turn mounts a bulbous valve member 44 arranged to cooperate with the opening 40 to seal an upper compartment 46 from a lower compartment 48 containing the spring lever 42. In order to hold the bulbous member in sealing relationship with the opening 40 we have provided a stop or latch 50 within the compartment 48 that is spaced from the mounting lug 52 of the spring lever by a distance that is predetermined in order to let the tip of the spring lever 42 free itself of the lip of the latching member 50 whenever an excessive strain in the associated member causes growing of the dimension between the mounting lug and the latch 50 by deflecting one with respect to each other until the lap of lever 42 over stop 50 is exceeded to allow valve member 44 to spring open and communicate compartments 46 and 48.

FIGURE 4 shows still another form of strain indicating means that may be applied to a test member, and this form includes a transparent container 54 that is sealingly joined to the test member and provided with a fill opening 56, as may be seen. The container 54 encloses a laminated strain gauge 58 that is bonded to end fittings 60 and 62 at each end thereof with the end fittings being bonded or otherwise affixed rigidly to the test member. The laminated strain gauge is constructed with a hard brittle outer coating 64 enclosing a metal plate 66. In operation of the device shown by FIGURE 4 a solution of potassium feuocyanide is provided within the container 54 and upon excessive strain loading of a member 10 the brittle covering of the metal plate 66 will crack exposing large portions of bare metal to the solution within the container 54 to thereby bring about a color change.

In FIGURE 5 we have provided a similar container 68 with a glass bottle 70 enclosed thereby. As seen, the glass bottle is scratched as at 72 to provide a local weakness point and a spring lever 74 is suspended between a mounting 76 at one end and a latch 78 at the other with the distance between the mounting and the latch being such as to permit the spring lever 74 to be released upon a predetermined elongation of the aforementioned dimension. Adjacent the end of the spring lever 74 opposite that of the mounting provision we have placed a sharp pointed cone-like member 80 arranged to impinge upon the bottle 70 at the scratched portion thereof to thereby fracture the bottle and spill any solution therein into the solution within the container 68.

We have also tested a pure mechanical system in accordance with my invention which includes a transparent or opaque container 82 enclosing a spring mounted lever 84 having a red or otherwise colored flag 86 adjacent one end thereof opposite a mounting on lug 88 which is to be attached to a test member or shock strut wall, etc. Adjacent the end of the lever mounting the red flag we have provided a latch 90 which is a predetermined dimension from the mounting provision 88 aforementioned. Thus, upon any loading of an associated member or shock strut wall, etc., which would tend to elongate the dimension between the latch and the mounting, the spring will be tripped so that the red flag will underlie a window 92 in the container 82. In addition we have provided a port 85 within the container 82 to allow one to adjust the position of the mounting lug 88 with respect to the latch 90 (such as may be readily appreciated by those skilled in the art to which this invention relates), i.e., by the use of an accentric and cam attachment of the mounting 88 with the underlying structure. As seen in FIGURE 7, the latch 90 is grooved, as at 94, to releasably receive the lever 84. The groove 94 serves to locate the distance the lever 84 is above the member 10. We have found that without such means it is possible to raise or lower the lever end when latching it. This results in greater or lesser forces in triggering the lever.

In addition and as seen the gauge member should always be at a minimum height so that the strain in the rupturable member, lever, etc., is the same as in the member or specimen 10. If there is an appreciable distance then loading created by arching the surface would impart greater loads to the gauge. This would give rise to false indications, if permitted.

As has been indicated generally with FIGURES 3 through 6 and as now will be particularly described with reference to FIGURES 1 and 2, the operation of my strain indication means is as follows: Upon a strain or loading being applied to a wall or member 10 the distance between the mounting lugs or end fittings 30 and 32 will tend to increase by a predetermined amount. As may be fully appreciated by those skilled in the art this distance will be predictable so that it will be proportionable to the load imparted to member 10. Therefore, we have placed between, and attached to, the end fittings 30 and 32 a thin walled member which will withstand a certain amount of elongation but which will fracture upon this amount being increased. Upon fracturing of the capillary tube 24 the solution therewithin will spill into the chamber 20 of the container 12 which will chemically react with the solution therein to change color. Such a reaction would be experienced by the utilization of the slightly ammoniacal solution aforementioned within the capillary tube 24 and a solution of dimethylglyoxime within the chamber 20 of the container. As is no doubt familiar the solutions may be but two of many, such as a dye solution in one chamber and water in the other.

Various changes in details of construction may be made by those skilled in the art without departing from the spirit of the following claims which I set forth as prescribing the true scope of my invention.

We claim:

1. In a load transmitting member, an arrangement for indicating straining fatigue in the member, which arrangement comprises:

an enclosure affixed to said member;

a pair of end fittings mounted within said enclosure in spaced relationship;

a means to sealing divide said enclosure into first and second chambers filled with first and second fluid solutions; and a means operatively connected between said end fittings and normally arranged to maintain the integrity of said first and second chambers, which means upon experiencing a predetermined elongation of the space between said end fittings, as would be experienced upon straining said member, will open said first and second chambers to each other to allow commingling of said first and second fluid solutions therewithin which fluid solutions are chosen so as to bring about a visual change in the enclosure providing an indication of the experiencing of an excess load on said member.

2. In a load transmitting member, an arrangement for indicating obtainment of a predetermined strain condition within the member, which arrangement comprises:

a transparent container sealingly affixed to said member, said transparent container forming a sealed member on said member;

a first and second means affixed to said member in spaced relation within said chamber;

an indicating means affixed at each end to said first and second means within said chamber, said indicating means being formed as a rupturable member which rupturable member is provided with an internal sealed chamber;

a first fluid solution within the chamber formed by the transparent container being sealingly affixed to said member; and a second fluid solution within the chamber of said rupturable member, which second fluid solution is chosen to be one which will react with said first fluid solution when coming in contact therewith to bring about a color change in said first fluid solution, said rupturable member being arranged so as to release said second fluid solution upon the occurrence of an abnormal stress on the rupturable member to open the chamber therewithin to the chamber formed by the transparent container.

3. A strain indicator comprising:

an enclosure having a means to observe the interior thereof, which enclosure is operatively connected to a member which is to experience strain loading, said enclosure having a partition therein dividing said enclosure into a first chamber and a second chamber, said partition having an opening therethrough for communicating said first and second chambers;

a pair of spaced mounting lugs operatively connected to said member within one of said chambers in said enclosure;

a first indicating composition contained by said enclosure within said first chamber;

a second indicating composition within said second chamber of said enclosure; and a means operatively connected to each of said spaced end fittings, said means having a valve member operatively arranged to close said opening in said partition which valve member normally closes off communication of said first and second chambers so long as said means is operatively connected to both of said mounting lugs and is arranged to be released from one of the mounting lugs to commingle said first and second indicating compositions whenever a strain in the member has elongated the space between the mounting lugs beyond a predetermined limit, said first indicating means and said second indicating means being chosen to create a visible reaction upon commingling thereof.

4. In a load transmitting member, an arrangement for indicating stress loading within the member, which arrangement comprises:
- a first and second mounting lug means affixed to the member in spaced relation;
- a structural element affixed to each of said first and second mounting lug means including, a fracturable enclosure wholly containing a first indicating composition, said fracturable enclosure being arranged to expose said first indicating composition after experiencing a predetermined elongation of said structural element as will be caused by excessive strain loading elongating the space between said mounting lugs;
- a housing sealingly affixed to the member providing a chamber surrounding said structural element; and
- a second indicating composition within said chamber of said housing surrounding said structural element, which second indicating composition is of a nature that will upon contact with said first indicating composition create a visible sign that excessive stresses have been experienced by the load transmitting member which will be readily viewable through the housing.

5. An arrangement for indicating stress loading according to claim 4 wherein said structural element is characterized as a capillary tube closed at both ends by fluid chambers containing an ammonical solution forming the first indicating means.

6. An arrangement for indicating stress loading according to claim 4 wherein said first indicating composition is characterized as a solution of ammonia hydroxide, nickel nitrate, and water and said second indicating composition is characterized as a solution of dimethylglyoxime.

References Cited by the Examiner
UNITED STATES PATENTS

| 2,601,440 | 6/1952 | Kerrigan | 1 —114.29 |
| 2,607,998 | 8/1952 | Weaver et al. | 33—147 |
| 2,674,221 | 4/1954 | Tinsley | 116—114.29 |
| 3,013,524 | 12/1961 | York | 116—114.29 |

OTHER REFERENCES

"Colorimetric Metal Analysis," Sandell E. B., chapter XXX, pages 339–344.

LOUIS J. CAPOZI, *Primary Examiner.*